United States Patent
Southern

[15] 3,646,454
[45] Feb. 29, 1972

[54] CONTROL SYSTEMS HAVING PROPORTIONAL AND INTEGRAL CONTROL

[72] Inventor: Michael Southern, Bognor Regis, England
[73] Assignee: Rosemount Engineering Company Limited, Bognor Regis, England
[22] Filed: Feb. 24, 1970
[21] Appl. No.: 13,572

[30] Foreign Application Priority Data
Feb. 24, 1969 Great Britain..................9,829/69

[52] U.S. Cl..................328/127, 235/183, 307/263, 328/131, 328/150
[51] Int. Cl..................................................G06g 7/18
[58] Field of Search..............235/183, 151.1; 328/127, 128, 328/131, 150; 307/263

[56] References Cited

UNITED STATES PATENTS

| | | |
|---|---|---|
| 3,051,898 | 8/1962 | Eynon.....................328/127 |
| 3,167,718 | 1/1965 | Davis......................328/127 |
| 3,419,784 | 12/1968 | Winn......................328/127 |
| 3,482,116 | 12/1969 | James.....................328/127 |
| 3,515,343 | 6/1970 | Schwartzenberg........235/183 |
| 3,517,170 | 6/1970 | Banham..................235/183 |
| 3,521,046 | 7/1970 | Tippetts..................235/183 |
| 3,541,318 | 11/1970 | Miller....................235/183 |

OTHER PUBLICATIONS

Russel et al., The Analog Computer as a Process Controller, Control Engineering, pp. 160– 162, Sept. 1957.

Primary Examiner—Donald D. Forrer
Assistant Examiner—David M. Carter
Attorney—Dugger, Peterson, Johnson & Westman

[57] ABSTRACT

In a control system having a controller providing an output control signal with at least proportional and integral components, means are provided operative when the output signal reaches a predetermined value to inhibit operation of the integrating means until the control is back within the proportional band so as thereby to prevent integral saturation.

7 Claims, 5 Drawing Figures

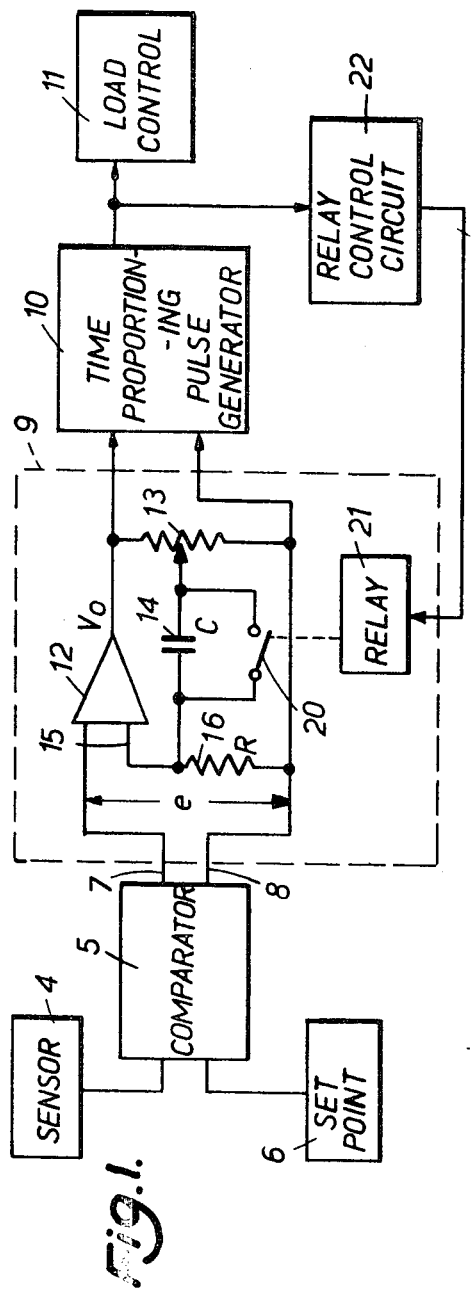
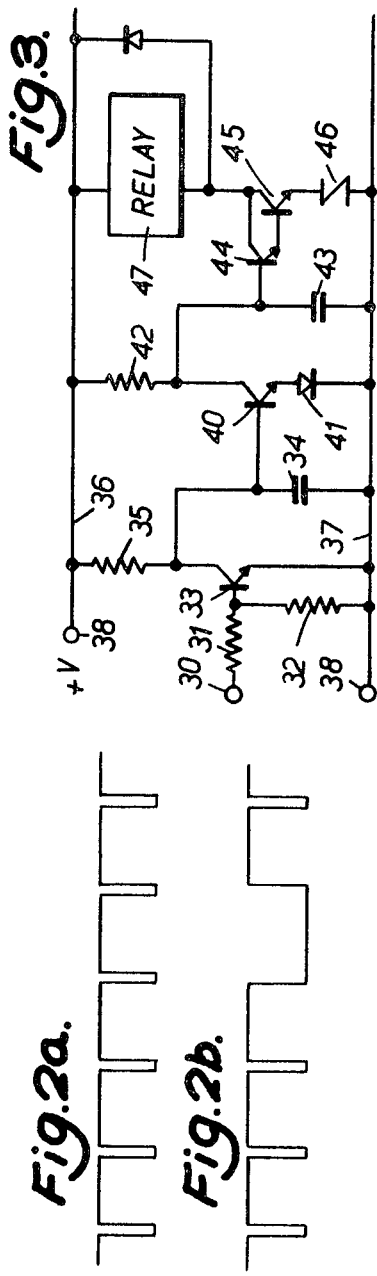

CONTROL SYSTEMS HAVING PROPORTIONAL AND INTEGRAL CONTROL

BACKGROUND OF THE INVENTION

This invention relates to control systems having proportional and integral control.

Any proportional control system for controlling a variable in accordance with a set value has a residual or steady-state offset of the control variable from the set value dependent on the gain in the control system and the output level. This offset can be minimized by using the highest possible gain consistent with stability but the actual value of the offset will vary with the required output level. It is well known that, in order to remove this offset, a time-dependent term formed by integrating the error between the set value and the actual value can be introduced into the control loop. This modifies the output level by an amount dependent upon the time integral of this error. Normally the integral action will cause the output to change so to remove the error and this action will itself reduce as the error reduces. However, under certain conditions, for example, when a large step change is called for or when equipment is started up, a large error will, of necessity, exist for some time even although the output of the controller calls for the maximum rate of change of the variable (e.g., by calling for the maximum output power) possible to remove the error. In this case, the summation in the integrating system, for example the charge on an integrating capacitor in an electrical control system, will go on increasing in order to try and remove the error. This gives rise to a condition known as integral saturation. As the measured value of the variable approaches the set value, the output of the controller does not drop to zero, as it would do without the integral action, and so the controlled variable overshoots. The overshoot may be by a considerable amount before the controller output drops to zero and the process returns to the control condition in the normal manner.

It is an object of this invention to provide an improved method of controlling such overshoot.

SUMMARY OF THE INVENTION

According to the present invention, in a control system for controlling a variable in accordance with a set value and having a controller responsive to an input error signal and providing an output control signal, said controller including means for integrating the error signal to provide an integral component which is combined with a proportional component in said output control signal, there are provided means operative when said output control signal calls for maximum rate of change of the variable to inhibit operation of said integrating means. In a system where said controller is an electrical controller, the integrating means may comprise a capacitor in series with a resistance in a feedback circuit of an amplifier and, in this case, the inhibiting of operation of the integrating means may be effected by putting a shunt, e.g., a short circuit, across the capacitor. For this purpose, a relay having contacts in shunt with the capacitor may be provided with circuit means for operating the relay to close its contacts and thereby to short circuit the capacitor when the controller calls for maximum rate of change of the variable.

It will be seen that with this arrangement, when maximum rate of change of the variable is called for, as may be the case, for example, on starting up a plant or when a large step change is introduced, the integrating means producing an integral component in the output control signal is rendered ineffective. As soon however as the controller is operating in the proportional band, the integrating means then becomes effective to operate in the normal manner. The controller may provide a derivative control in addition to proportional control and, in this case, the derivative control can operate normally in addition to the proportional control all the time.

The invention is particularly applicable to on-off control systems using an electrical controller providing an output control signal representing alternatively on and off periods for the switching of power, the on periods being of constant duration and the controller controlling the occurrence of the on-periods. Such a system may be used, for example, to apply power from an alternating current supply to a load during integral cycles or half cycles of the supply frequency. It is often preferable to have discrete signals for each period of supply, not a continuous signal and typically, to call for maximum power, the controller would give a series of pulses with short intervals between them, e.g., 90 percent on and 10 percent off. In such a system there may be provided means responsive to the output signals operative in the absence of a signal from the controller for the duration of a period in which an output pulse would have been possible, which means reset a delay circuit, which delay circuit is operative, with a delay period after resetting much greater (e.g., a 100 or more times) then the cycle time, to effect the aforementioned inhibiting of operation of said integrating means. The delay circuit may control the aforementioned relay.

The delay circuit may conveniently comprise a capacitor fed from a constant current source, e.g., fed via a resistor from a constant voltage source, with a switch operative to short circuit the capacitor of the delay circuit when the output of the controller gives an off-period longer than the interval between successive on-pulses when maximum demand is called for.

BRIEF DESCRIPTION OF THE DRAWINGS

FIG. 1 is a diagram illustrating a control system with an electrical controller producing a proportional and integral control output from an error signal;

FIGS. 2a and 2b are waveform diagrams;

FIG. 3 is a diagram illustrating part of a circuit employed in one embodiment of the present invention.

DESCRIPTION OF THE PREFERRED EMBODIMENTS

Figure 4:
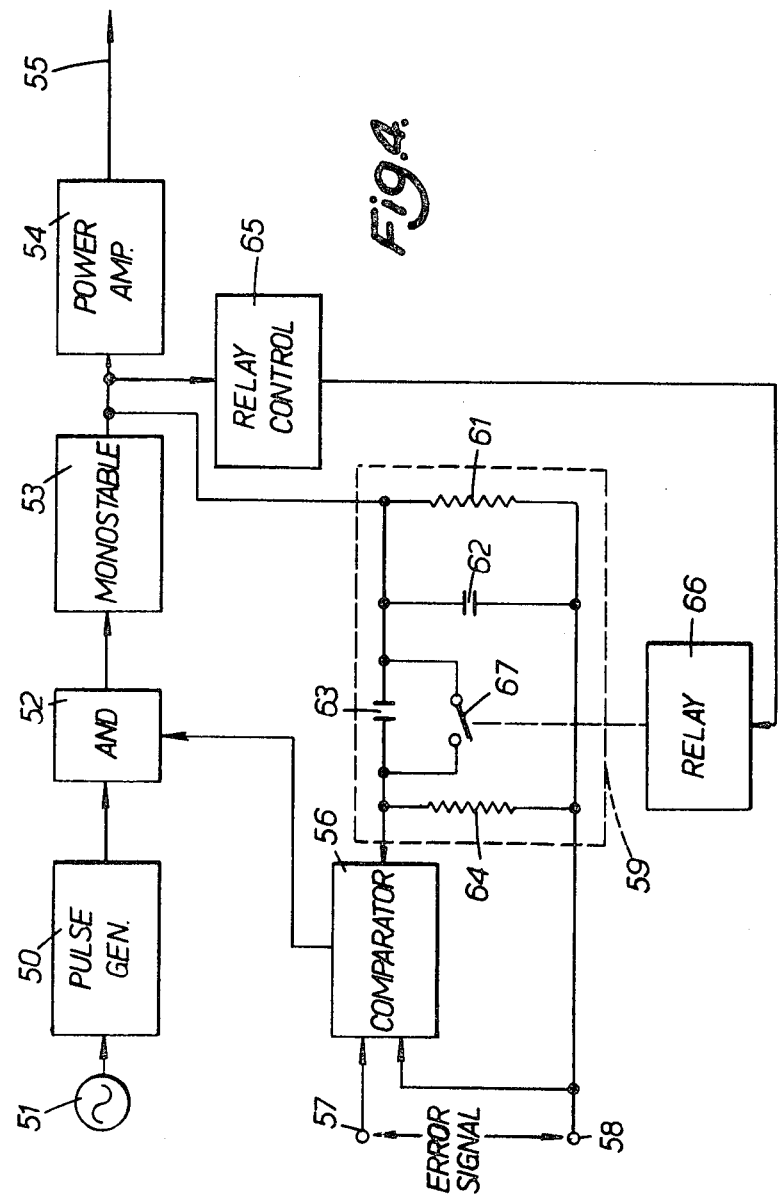
FIG. 4 illustrates another control system embodying the invention.

FIG. 1 illustrates diagrammatically a control system including an electrical controller for generating a proportional and integral signal dependent on the magnitude of an error signal $e$ representing the difference between the sensed value of a variable and the required or set value.

A sensor 4 senses the value of a variable and this sensed value is compared in a comparator 5 with a set point, which may be predetermined or adjustable, derived from a set point control 6 to produce an error signal output between leads 7, 8. This error signal is applied to a controller 9, to be described in further detail later, to give a control output which, in this particular embodiment, is applied to a time-proportioning pulse generator 10 which gives pulse signals, applied to a load control 11. The presence of a pulse results in an on-period for the application of power to a load while the absence of a pulse results in an off-period. The system is a closed-loop control system in that the sensor 4 is responsive to a parameter dependent on the application of power to the load.

In the controller 9, the error signal $e$ on leads 7,8 is applied to an amplifier 12 which produces an output $V_o$. This is tapped by means of a potentiometer 13 to give a feedback voltage $V_o/K$. A feedback network is provided consisting of a capacitor 14 of magnitude C between the tap on the potentiometer and one input terminal 15 of the amplifier and a resistor 16 of magnitude R between this input terminal 15 and the line 8. It can be shown that the output $V_o$ is given by $$V_o = Ke + K/RC \int e \, dt.$$

This feedback network thus provides proportional and integral components in the output. Putting a short circuit across the capacitor 14 will remove the integral component but will leave the proportional component.

The short circuit can be put across the capacitor 14 by closing contacts 20 of a relay 21 and thus this circuit can be switched by the relay 21 from providing both proportional and integral outputs combined into a circuit providing only a proportional output.

The relay 21 has to be operated to short circuit the capacitor 14 when the output control signal calls for maximum rate of change of the variable; in this particular embodiment, it is necessary to operate the relay when the controller 9 calls for maximum power to the load. The operation of the relay might be effected therefore by using a voltage-responsive circuit connected to the output of the controller 9 and arranged to operate the relay 21 when the voltage output $V_o$ exceeds a predetermined value.

In the particular arrangement illustrated in FIG. 1, however, the relay 21 is controlled by a relay control circuit which will be described in further detail later with reference to FIG. 3 and which is responsive to the pulse output from the pulse generator 10. The pulse generator 10 produces constant duration pulses, control of the load being effected by control of the number of pulses applied in a given time interval. On-off control systems of this kind find particular use where the duration of the control pulses is substantially equal to the duration of a half cycle or full cycle of an alternating current supply. By synchronizing the pulses with the alternating supply frequency, switching transients can be minimized and reactive loading of the power system reduced. A preferred form of time-proportioning pulse generator is described in the specification of U.S. Pat. No. 3,365,654 issued to James S. Johnson titled Circuits for Controlling Electrical Power.

FIG. 2a shows a series of pulses representing the output of the unit 10 when the maximum possible power is to be supplied to the load. The on-pulses, that is, those calling for power to the load, might typically have a duration of 90 percent of a pulse cycle time. Thus a series of successive pulses have a short time interval between them which is 10 percent of the pulse cycle time. FIG. 2b shows a similar series of pulses in which the required load demand is slightly reduced and it will be seen that one of the on-pulses is omitted.

Referring now to FIG. 3 which illustrates in further detail the relay control unit 22 of FIG 1, the pulses from the time-proportioning pulse generator 10 at an input terminal 30 are applied via a resistive input network 31, 32 to the base of a transistor 33 which is connected in shunt across a capacitor 34. The shunt circuit formed by the transistor 33 and capacitor 34 is in series with a resistor 35 between supply lines 36, 37 connected to terminals 38 of a direct voltage supply source. The circuit is arranged so that pulses such as those shown in FIG. 2a cause the transistor 33 to be switched on except for the short interval between successive pulses. The voltage across the capacitor 34 is applied as a switching voltage to a transistor 40. The time constant of the capacitor-resistance circuit 34, 35 is such that the capacitor 34 will not charge during the short off-period between pulses to a sufficient level that the voltage across it can switch on the transistor 40. This transistor 40 is connected in series with a diode 41 and a resistor 42 across the aforementioned supply lines 36, 37. In shunt with the transistor 40 and diode 41 is a capacitor 43. The output voltage across the capacitor 43 is applied as a switching voltage to a further transistor-switching circuit comprising compounded transistors 44 and 45. These transistors together with a Zener diode 46 are connected in series with an operating coil 47 of the aforementioned relay 21 having the contacts 20 across the capacitor in FIG. 1. The capacitor-resistor circuit 42, 43 constitutes the aforementioned delay circuit. The time constant of this capacitor-resistor circuit 42, 43 is such that the transistor 40 has to be switched off for a time much greater than the duration of the pulses of FIG. 2a in order to switch on the compounded transistors 44, 45 and so energize the relay operating coil 47. Typically the time constant of the circuit 42, 43 would be of the order of 5 seconds where the pulses have a time duration substantially equal to integral cycles or half cycles of a 50-Hz. or 60-Hz. alternating supply.

It will be seen that so long as the controller 9 and time-proportioning pulse generator 10 is giving an output of the form shown in FIG. 2a, the transistor 33 will remain switched on for the greater part of the time, 90 percent of the time if the interval between the pulses is 10 percent of the cycle as described above. The time constant of the circuit 34, 35 associated with this transistor is such that the second transistor 40 will remain switched off so long as the controller output consists of on-pulses. So long as this second transistor 40 is switched off, the associated timing circuit 42, 43 will charge the capacitor 43 and, after the appropriate time period, for example, 5 seconds, the compounded transistor 44, 45 will switch on and will energize the relay 47 so that the integrating capacitor 14 in the controller circuit is short circuited by the contacts 20. Thus the controller will provide a proportional control with no integral component. As soon, however, as the controller no longer demands maximum power, a gap will occur in the pulse train and the capacitor 43 controlling the compounded transistor 44, 45 will discharge so that the relay contacts 14 open and the controller operates with integral and proportional control. The controller will continue to operate with integral and proportional control until the next occasion when maximum power is demanded for a sufficient period, e.g., 5 seconds, to recharge the capacitor 43 to a sufficient level to switch the transistors 44, 45.

FIG. 4 illustrates an arrangement in which the controller and the pulse generator are integrated. A pulse generator 50 is fed from an alternating current mains supply 51 to produce pulses at twice the supply frequency and these are applied through an AND-gate 52 to a monostable multivibrator 53 forming a pulse shaper giving, for each pulse from the AND gate, a pulse of closely defined amplitude and duration which is applied to a power amplifier 54 giving an output control signal on a lead 55 for application to a controlled rectifier controlling the supply to a load of power from the alternating mains supply. Operation of the AND-gate 52 is controlled by a comparator 56 comparing an error signal across input terminals 57, 58 with a feedback derived from the output of the multivibrator 53 via a network 59. This network comprises a shunt resistor 61 and a shunt capacitor 62 feeding a series capacitor 63 and shunt resistor 64.

It may be shown that the relationship between the voltage V applied to the comparator from this network and the current i fed into the resistor 61 is $$i = \frac{1}{R_1}\left[ V\left(1 + \frac{R_1 C_1}{R_2 C_2}\right) + \frac{1}{R_2 C_2}\int V dt + R_1 C_1 \frac{dV}{dt}\right]$$

where $R_1$ and $R_2$ are the resistances of resistors 61 and 64 respectively and $C_1$ and $C_2$ are the capacitances of capacitors 62 and 63 respectively. If $C_1 R_1$ is much less than $C_2 R_2$, the proportional component in i is determined by $R_1$, the derivative component can be set by choice of $C_1$ and the integral component can be independently controlled by $R_2$ or $C_2$.

A relay control unit 65, which may be similar to that of FIG. 3, deriving from the output of the multivibrator 53, a signal to operate a relay 66 having contacts 67 across the capacitor 63 thereby to short circuit the capacitor when the controller calls for maximum rate of change of the variable, i.e., when there is the maximum number of pulses from the multivibrator 53. It will be seen that the closing of the relay contacts serves to prevent integral saturation in the network.

I claim:

1. An electrical controller for automatically controlling a variable at a set value by providing, in response to an input error signal, an output control signal representing alternately on and off periods for the switching of power, the on periods being of constant duration, which controller comprises means for integrating the error signal to provide an integral component, means summing the integral component with a signal derived from and proportional to the error signal to provide an analogue output signal, a time-proportioning pulse generator coupled to said summing means to be responsive to said analogue output signal to produce constant duration pulses constituting on periods which alternate with off periods, said analogue output signal controlling the occurrence of said on periods, a relay having contacts operative on said integrating means to inhibit the integration of the error signal when the relay contacts are closed, a relay control circuit coupled to said pulse generator to energize the relay in response to the pulse output from the pulse generator, a resettable delay in said relay control circuit operative to delay energization of the relay for a period after resetting of the delay, and means responsive to the absence of a pulse from said pulse generator for a predetermined time period to reset said delay.

2. An electrical controller as claimed in claim 1 wherein said pulse generator includes alternating current energized means synchronizing the pulses with cycles of an alternating current whereby the analogue output signal controls the presence or absence of pulses at a fixed time in each cycle.

3. A control system as claimed in claim 2 wherein said delay circuit has delay period at least 100 times the cycle time.

4. An electrical controller as claimed in claim 2 wherein said delay circuit comprises a first timing circuit including a first timing capacitor, switch means responsive to said pulse from said pulse generator shorting said first timing capacitor in response to each pulse, the first timing circuit, switch means responsive to the charge on said first timing capacitor, a second timing circuit having a time constant long compared with cycle time, said second timing circuit including a second timing capacitor, said switch means shunting said second timing capacitor when the charge on the first timing capacitor reaches a predetermined value and when said relay control circuit is responsive to the charge on said second capacitor.

5. An electrical controller for automatically controlling a variable at a set value by providing, in response to an input error signal, an output control signal representing alternately on and off periods for the switching of power, the on periods being of constant duration, which controller comprises a mains synchronized pulse generator, a gate circuit having a pair of inputs and an output, one of said inputs being connected to the output of said pulse generator, a feedback network including an integrating capacitor coupled to the output from said gate, a comparator comprising said error signal with a feedback signal from said feedback network, said comparator feeding an opening signal to the second input of said gate if the error signal exceeds the feedback signal, a relay having contacts for shunting said feedback capacitor, a relay control circuit coupled to said pulse generator to energize the relay in response to the pulse output from the gate, said relay control circuit including a resettable delay delaying operation of the relay for a period after resetting of the delay and means responsive to the absence of a pulse from said gate resetting said delay.

6. An electrical controller for automatically controlling a variable at a set value by providing, in response to an input error signal, an output control signal representing alternately on and off periods for the switching of power, the on periods being of constant duration, which controller comprises means for integrating the error signal to provide an analogue output signal containing integral and proportional components of the error signal, said integrating means including a feedback circuit having a capacitor and resistor connected in series, a time-proportioning pulse generator coupled to the output of said integrating means to be responsive to said analogue output signal to produce constant duration pulses constituting on periods which alternate with off periods, said analogue output signal controlling the currents of said on periods, switch means for short circuiting said capacitor to prevent the integration of the error signal, a control circuit coupled to said pulse generator to cause said switch means to short circuit said capacitor in response to the pulse output from the pulse generator, said control circuit including resettable delay means operative to delay the operation of said switch means into its said short-circuiting relationship for a period after resetting of the delay, and means influenced by the absence of a pulse from said pulse generator for preventing the resetting of said delay for a predetermined time thereafter.

7. An electrical controller as claimed in claim 6 wherein said integrating means includes an amplifier having a pair of input terminals and an output terminal, said analogue output signal appearing at said output terminal, and said feedback circuit containing said capacitor and resistor being connected in parallel with said amplifier between said output terminal and one of said input terminals, whereby when said capacitor is short circuited by said switch means said integral component is removed from said analogue output signal and only said proportional component remains.

* * * * *